United States Patent [19]

Angelino

[11] Patent Number: 5,536,417
[45] Date of Patent: Jul. 16, 1996

[54] METHODS AND SYSTEMS FOR PREWASHING AUTOMATIC BACKWASHING FILTERS

[75] Inventor: Stephen P. Angelino, Midlothian, Va.

[73] Assignee: Infilco Degremont Inc., Richmond, Va.

[21] Appl. No.: 181,771

[22] Filed: Jan. 14, 1994

[51] Int. Cl.[6] .................................................. B01D 24/46
[52] U.S. Cl. .......................... 210/739; 210/96.1; 210/264; 210/269; 210/794
[58] Field of Search ............................ 210/85, 94, 96.1, 210/275, 264, 792, 793, 794, 795, 798, 269, 745, 746, 739

[56] References Cited

U.S. PATENT DOCUMENTS

| | | | |
|---|---|---|---|
| 3,239,061 | 3/1966 | Horning et al. | 210/793 |
| 4,032,443 | 6/1977 | Ross | 210/793 |
| 4,113,612 | 9/1978 | Sekoulov et al. | 210/794 |
| 5,089,147 | 2/1992 | Ross | 210/793 |
| 5,137,645 | 8/1992 | Miller | 210/793 |
| 5,147,560 | 9/1992 | Nichols | 210/745 |
| 5,362,384 | 11/1994 | Whetsel | 210/793 |

*Primary Examiner*—Joseph W. Drodge
*Attorney, Agent, or Firm*—Carroll F. Palmer

[57] ABSTRACT

New methods are disclosed for improving the cleansing the plurality of seriate filter beds in automatic backwash filtering systems, equipped with a traveling backwash shoe, in which the beds are backwashed one at a time with backwash liquid from an effluent channel common to seriate effluent ports of the plurality of filter beds by pumping the backwash liquid seriatim through separate effluent ports of individual filter beds and then flowing filtered effluent from each bed through its effluent port into the effluent channel, repeating such steps of backwashing and flowing filtered effluent on individual filter beds until all the filter beds in the system have been backwashed, wherein, simultaneously with the backwashing of such active bed, the bed forward in the direction of travel of the backwash shoe is subjected to a prewash with chemical treatment liquid by pumping such liquid upwardly in such forward bed through its effluent port. Apparatus for carrying out the improved methods is also disclosed.

11 Claims, 2 Drawing Sheets

METHODS AND SYSTEMS FOR PREWASHING AUTOMATIC BACKWASHING FILTERS

BACKGROUND OF THE INVENTION

1. Field of the Invention

This application relates broadly to improvements in automatic backwash filtering methods and systems. More particularly, it concerns methods and apparatus for prewashing of filter cells in automatic backwash filter systems in conjunction with backwash operations in such systems.

2. Description of the Prior Art

Automatic backwash filter systems are known in the art as exemplified in U.S. Pat. Nos. 3,239,061; 4,133,766; 4,617,131 and 4,764,288 currently assigned to Infilco Degremont Inc., the assignee of the invention disclosed herein. Such systems are further exemplified in Infilco Degremont's brochure DB-370, dated May, 1989, entitled ABW® Automatic Backwash Filter. The disclosures of these patents and the brochure are incorporated herein by reference.

Automatic backwash filter systems are used for the treatment of industrial and municipal water supplies, for treatment of industrial and sewage effluents, etc. because of their proven efficiency and performance for such operations. Such systems are superior to other equipment designed for the same services because they are automatic, self-cleaning and provide optimum performance, without shutdown or changeover typical of conventional filtration equipment.

Automatic backwash filter systems comprise a battery of individual cells that filter influent by gravity flow through them into a common launder. Backwashing is performed automatically and seriatim on the separate cells and in improved types the quality of such backwashing can be monitored to ensure the backwashed cells will output effluent meeting mandated standards (see U.S. Pat. No. 5,147,560).

After a number of repeated automatic backwash cycles, it is necessary to take the system off line to conduct chemical cleaning thereof. In lieu of this, e.g., where environmental regulations prevent typical chemical cleaning, disinfectants are injected into the suction side of the backwash pump when the backwash pump is operating. However, this latter type operation is ineffective and requires large quantities of chemicals because their effectiveness is reduced by the high velocity of the backwash flow. The present invention addresses these problems of prior methods of chemical cleansing of automatic backwash filter systems and provides improvements that eliminate off line downtime and improve effectiveness of chemical usage.

OBJECTS

A principal object of the invention is the provision of improvements in automatic backwash filtering systems.

A further object is the provision of new apparatus and new prewashing methods for chemical cleansing of automatic backwash filtering systems.

Another object is the provision of such methods for chemical cleansing of automatic backwash filter systems that operate with a minimum of problems, reduce chemical usage and do not contaminate effluent water with cleansing chemicals, e.g., make it possible to use chlorine where system effluent restrictions apply.

An additional object is the provision of automatic backwash filter systems having improved ability to manage biological growth, grease accumulations and like problems.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by improvements in automatic backwash filter systems that include a filter tank divided into a plurality of seriate cells containing filter media, influent means for delivering liquid to be filtered to the top of the filter media, a separate port in each the cell beneath its the filter media for discharging liquid from and charging liquid to the respective the cell, an effluent channel common to the plurality of the separate ports that all communicate with the effluent channel through a longitudinal planar surface in which the separate ports are substantially equally spaced apart a predetermined distance along a longitudinal axis, backwashing means including a pump for forcing backwashing liquid through the separate ports one at a time to flow upwardly through the cell associated with the respective the port, a backwash shoe that slides along the planar surface to access the separate ports and motor means for sliding the backwash shoe in both directions along the planar surface.

The improvement of the invention comprises a backwash shoe with a sliding surface for longitudinal movement along the planar surface in fluid tight contact therewith, such sliding surface having therein a central opening, a forward opening, i.e., ahead of the central opening with respect to the direction of travel of the backwash shoe and a rearward opening, the centers of which are spaced apart the predetermined distance.

First conduit means connects the backwashing means pump to the central opening. A prewash pump is connected to a source of chemical treatment liquid and second conduit means connects the prewash pump to the forward opening.

In one embodiment, there is a waste water pump and third conduit means for conveying liquid from the waste water pump to waste (a) connects the waste water pump to the rearward opening and (b) includes monitor means for monitoring the waste water being conveyed therein.

The objects of the invention are further accomplished by the provision of improvements in methods of cleansing a plurality of seriate filter beds in an automatic backwash filter system by backwashing the beds one at a time by withdrawing backwash liquid from an effluent channel common to seriate effluent ports of the plurality of filter beds and pumping the backwash liquid through a first port which is the effluent port of a first filter bed of the plurality of filter beds, purging waste liquid to waste through the first port from the first bed subsequent to the backwashing and then flowing filtered effluent from the first bed through the first port into the effluent channel, repeating the steps of backwashing, purging and flowing filtered effluent on a second filter bed through a second port which is the effluent port of the second bed and further repeating of such cleansing operation with third and further beds through their respective effluent ports.

The improved methods of the invention comprise the steps, during at least part of the backwashing of the first bed, of prewashing the second filter bed by pumping chemical cleansing liquid from an external source through the second port while backwash liquid is pumped through the first filter bed, discontinuing the backwashing of the first bed and the prewashing of the second bed, thereafter backwashing the second bed, during at least part of the backwashing of the second bed, prewashing the third bed by pumping chemical cleansing liquid from an external source through the third port, discontinuing the backwashing of the second bed and the prewashing of the third bed, and applying the same combination steps in repeating of such backwashing and prewashing operations with the third and further beds.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
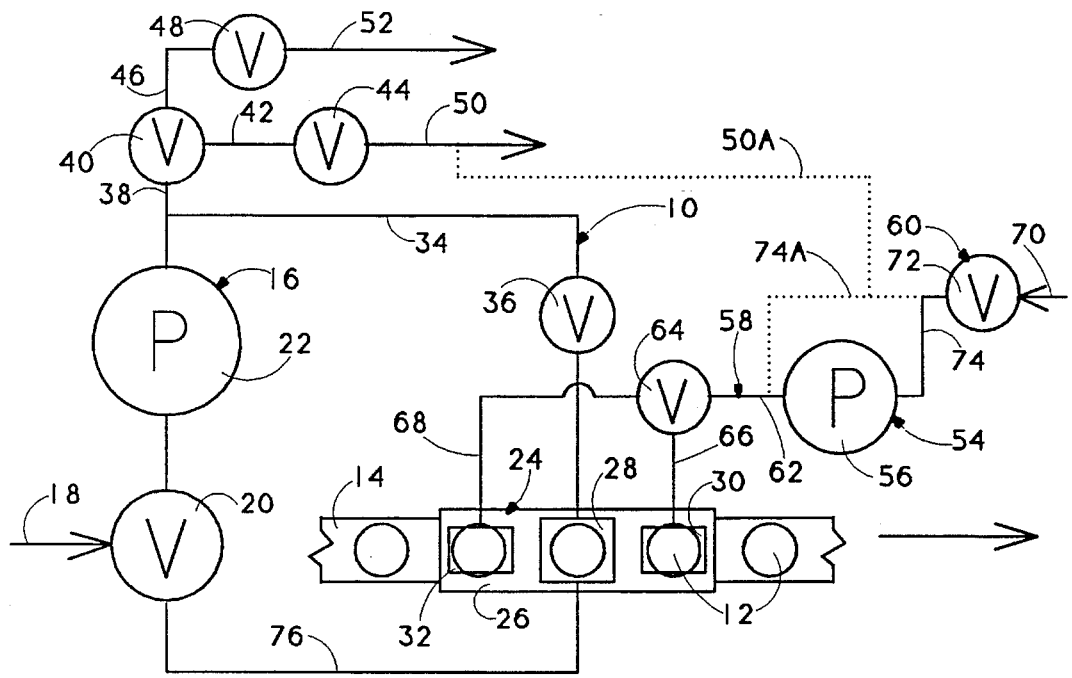
FIG. 1 is a schematic block diagram of a first embodiment of automatic backwash filtering systems of the invention capable of performing the new prewashing methods.

Referring in detail to the drawings and particularly FIG. 1, the cleansing system 10 which is an improvement over those disclosed in the aforesaid U.S. Pat. No. 4,617,131 that have a filter tank divided into a plurality of seriate cells containing filter media (not shown), influent means for delivering liquid to be filtered to the top of the filter media (not shown), separate ports 12 in each cell beneath its filter media for discharging liquid from and charging liquid to the respective the cell, an effluent channel (not shown) common to the plurality of the separate ports 12 that all communicate with the effluent channel through a longitudinal planar surface 14 in which the separate ports 12 are substantially equally spaced apart a predetermined distance along a longitudinal axis, backwashing means 16 including an influent conduit 18, a valve 20 and a pump 22 for forcing backwashing liquid through the separate ports 12, one at a time, to flow upwardly through the cell associated with each respective port for discharge to waste through a cleaner box (not shown) positioned at the top of the backwashing cell, a backwash shoe 24 that slides along the planar surface 14 to access the separate ports 12 and motor means (not shown) for sliding the backwash shoe 24 along the planar surface 14.

The backwash shoe 24 has a sliding surface 26 for longitudinal movement along the planar surface 14 in fluid tight contact therewith. The sliding surface 26 has a central opening 28, an opening 30 that is ahead of opening 28 with respect to the direction of travel of shoe 24 as shown by the arrow, hereinafter called the forward opening, and a rearward opening 32. The centers of these three openings are spaced apart about a similar, predetermined the distance.

A first conduit means 34 connects the backwash pump 22 via flow control valve 36 to the central opening 28.

The backwashing means 16 also includes by-pass line 38 and three-way diverter valve 40 that connects via line 42 to adjustable flow valve 44 and via line 46 to adjustable flow valve 48. Egress line 50 from valve 44 discharges into a channel (not shown) to thereby enable a portion of liquid from pump 22 to commingle with potable water output. Egress line 52 from valve 48 connects to either waste (not shown) or to influent of a filter system for refiltering. The ratio of outputs through lines 50 and 52 is not important to the invention herein described.

The cleansing system 10 is characterized by inclusion of prewash means 54 that comprises a prewash pump 56, conduit means 58 and a source of chemical treatment fluid 60.

The conduit means 58 comprises line 62 connecting prewash pump 56 to three-way valve 64, which in turn, connects to forward opening 30 via line 66 and to rearward opening 32 via line 68.

Chemical treatment fluid source 60 comprises a chemical treatment material source inlet line 70 to deliver fluid via valve 72, lines 74, 62 & 66 and 64 valve to forward opening 30 to flow upwardly through the filter cell associated with opening 30. Such upward prewash flow typically would be about 3–5 gals./min/sq.ft. of media and will be removed to waste by the overhang of the cleaner box positioned above the backwashing filter cell associated with central opening 28.

Instead of the flow of treatment material from inlet line 70 and valve 72 entering ahead of pump 56, it can enter downstream of the pump as illustrated by broken line 74A and some or nearly all of the flow through valve 64 and line 66 to the forward cell 30 can be egress from valve 44 via in lines 50A and 74A.

The source (not shown) for the inlet line will typically contain different types of treatment liquid, e.g., chlorine gas, detergent solution, disinfectant solution, etc. In some embodiments, the system 10 may comprise more than one inlet line 70 and valve 72.

In cleansing a plurality of seriate filter beds by backwashing the beds one at a time using the apparatus described above, backwash liquid from an effluent channel (not shown) common to seriate effluent ports 12 of the plurality of filter beds flows through conduit 18 and valve 20 to pump 22 and is pumped seriatim via conduit 34 and valve 36 through the separate effluent ports 12. The backwash sequence for each separate filter bed includes seven controlled modes of filtration, backwash, zero flow, and purging, namely, 1) filtration rate, typically about 2 gals./min./sq.ft. filter area (gpm/sq.ft.), decreasing to zero, 2) zero flow, 3) increasing backwash rate, 4) full backwash rate, typically 20 gpm/sq.ft., 5) decreasing backwash rate, 6) zero flow and 7) purging.

The prewash flow through forward opening 30 can continue throughout the entire backwash operation or function only during part thereof, e.g., only during the full backwash rate mode.

In the purging mode, purging liquid is withdrawn from the backwashed filter bed via its port 12, line 76, valve 20 (switched to blind conduit 18), line 38, valve 40, line 46, valve 48 and line 52 to waste. It should be noted, during the backwash phase, backwash liquid moves upwardly through the filter bed while during the purging phase, purging liquid, which mainly consists of influent to the filter bed, moves downward through the filter bed and at a slower flow rate, e.g. $\frac{1}{10}$th, than the full flow rate of the backwash liquid.

Following such backwash sequence, the backwash shoe 14 will move to the next effluent port 12. Typical travel time for backwash shoe movement from one port to another will be about 20–30 seconds. Subsequent to the backwashing, filtered effluent flows from the renewed bed through its effluent port into the effluent channel and the shoe 24 moves on to the next opening 12 in the next filter cell, such steps of backwashing, purging and flowing filtered effluent in individual filter beds is repeated until all the filter beds in the automatic backwash filter system 10 have been backwashed.

The valve 64 enables the shoe 24 to reverse direction and then have the system 10 operate in the same manner, i.e., prewash of filter cells through opening 32, which then becomes the forward opening, while backwashing of adjacent filter cells proceeds through central opening 28.

Figure 2:
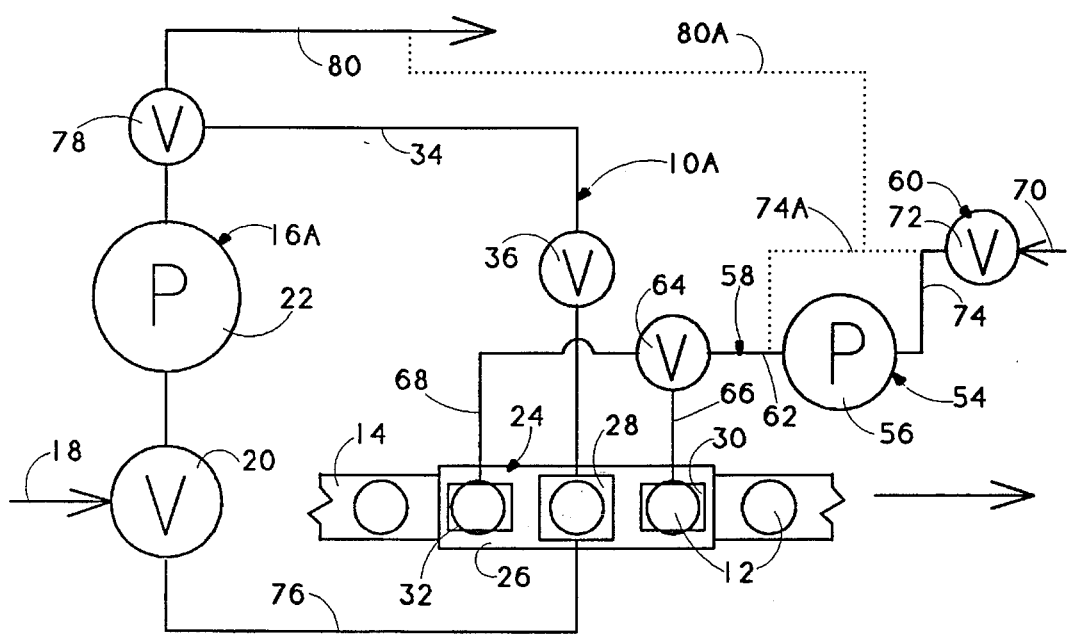
FIG. 2 is a schematic block diagram of a second embodiment of automatic backwash filtering systems of the invention capable of performing the new prewashing methods.

With reference to FIG. 2, in the cleansing system 10A, the openings 28, 30 & 32, rewash means 54 and other associated components are essentially as in cleansing system 10, but the backwash means 16A is different from backwash means 16 of system 10. Thus, the means 16A includes a diverter valve 78 and an egress line 80 for eventual passage of liquid to a filter member for refiltering or to a waste tank or like disposal means. Alternatively, some or nearly all of the flow through line 80 may be passed to the forward cell 30 via lines 80A and 74A as shown in dotted line in FIG. 2.

The method of rewashing filter bed in system 10A prior to backwashing is like the method in system 10, but there is a variation in the way waste is handled during backwashing and purging with system 10A as compared with system 10.

Yet another variation of the system 10 of FIG. 1 (not shown) can be used in accordance with the invention wherein valves 40, 44 & 48 and lines 38, 42, 46, 50 & 52 are eliminated so effluent from pump 22 goes only through line 34 and valve 36 to opening 28.

Such variations are not important to the invention herein disclosed, but serve to show that the new apparatus and methods of the invention are applicable to various automatic backwash filter systems that comprise a backwash shoe that transits a multiplicity of effluent ports in the filter system.

Figure 3:
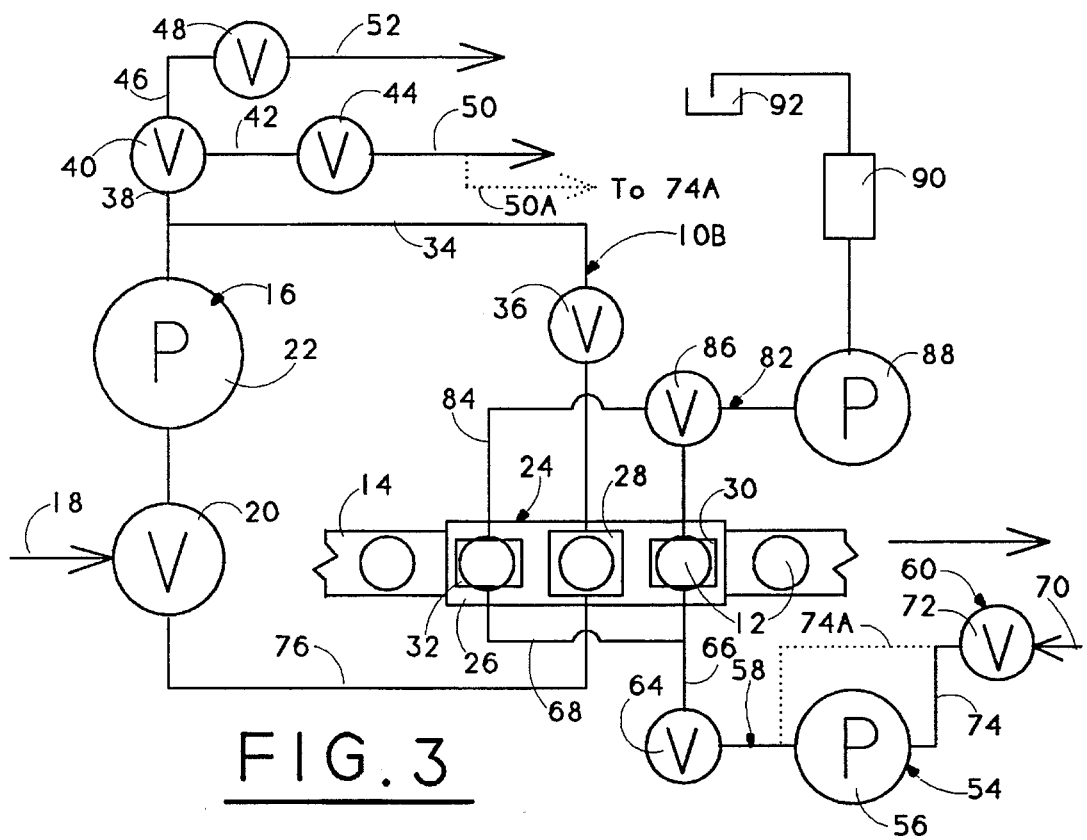
FIG. 3 is a schematic block diagram of a third embodiment of automatic backwash filtering systems of the invention capable of performing the new prewashing methods.

FIG. 3 illustrates a system 10B of the invention in which prewash of a filter cell through opening 30, which is forward in the direction of travel of the backwash shoe 24 of the cell being backwashed via central opening 28, is conducted while quality of effluent discharged through rearward opening 32 is being monitored (see U.S. Pat. No. 5,147,560). In this embodiment, conduit means 82, which comprises line 84, switch valve 86, pump 88 and monitor means 90, conveys waste water from rearward opening 32 to waste 92 while means 90 determines the quality of such waste water, e.g., by measuring its turbidity, particle content, pH, chlorine content, etc.

Figure 4:
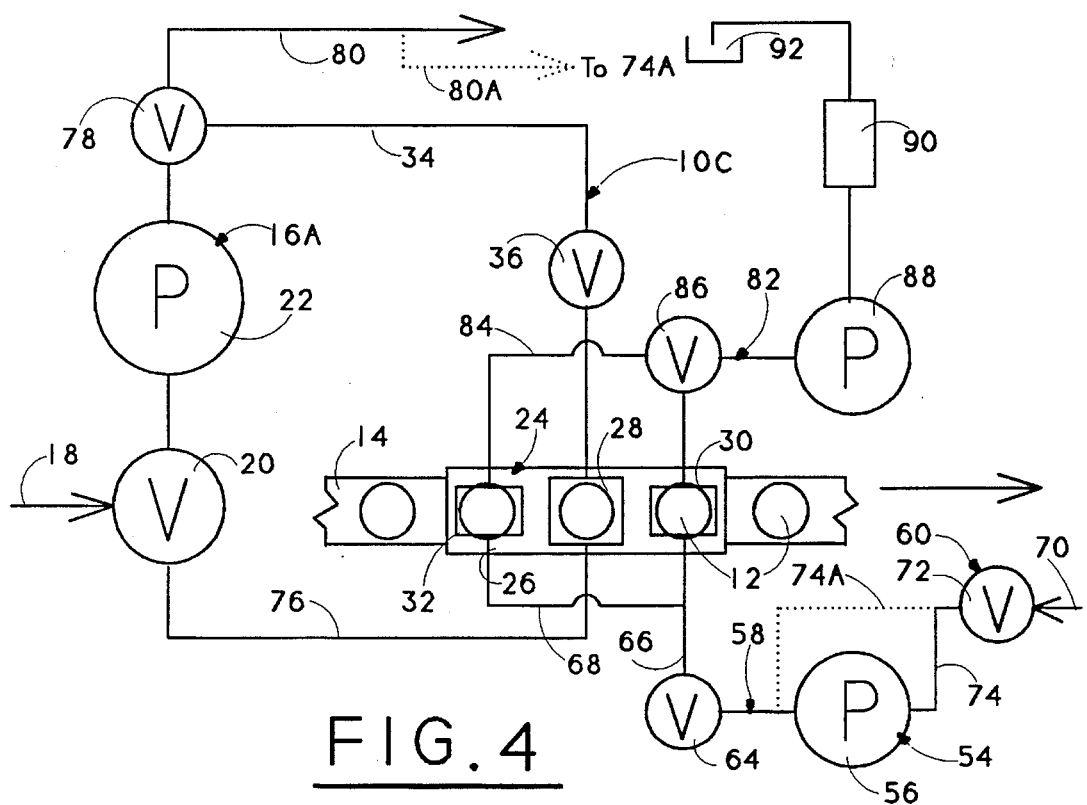
FIG. 4 is a schematic block diagram of a fourth embodiment of automatic backwash filtering systems of the invention capable of performing the new prewashing methods.

FIG. 4 illustrates a system 10C of the invention which is like that of system 10A with the addition of a monitoring feature such as described relative to FIG. 3.

The embodiments of the invention in which an exclusive property or privilege is claimed are defined as follows:

1. In a method of cleansing a plurality of seriate filter beds in an automatic backwash filter system by backwashing said beds one at a time by pumping backwash liquid through a first port which is the effluent port of a first filter bed of said plurality of filter beds and then flowing filtered effluent from said first bed through said first port into an effluent channel, repeating said steps of backwashing and flowing filtered effluent on a second filter bed through a second port which is the effluent port of said second bed and further repeating of such cleansing operation with third and further beds through their respective effluent ports, the improvement which comprises in combination the steps:

during at least part of said backwashing of said first bed, prewashing said second bed by pumping chemical cleansing liquid from an external source through said second port to flow upwardly through said second bed, discontinuing said backwashing of said first bed and said prewashing of said second bed, thereafter backwashing said second bed.

during said backwashing of said second bed, prewashing said third bed by pumping chemical cleansing liquid from an external source through said third port to flow upwardly through said third bed, discontinuing said backwashing of said second bed and said prewashing of said third bed, and applying said combination steps in repeating of such backwashing and prewashing operations with said third and further beds.

2. In a method of cleansing a plurality of seriate filter beds in an automatic backwash filter system by backwashing said beds one at a time by withdrawing backwash liquid from an effluent channel common to seriate effluent ports of said plurality of filter beds and pumping said backwash liquid through a first port which is the effluent port of a first filter bed of said plurality of filter beds, purging waste liquid to waste through said first port from said first bed subsequent to said backwashing and then flowing filtered effluent from said first bed through said first port into said effluent channel, repeating said steps of backwashing, purging and flowing filtered effluent on a second filter bed through a second port which is the effluent port of said second bed and further repeating of such cleansing operation with third and further beds through their respective effluent ports, the improvement which comprises in combination the steps:

during at least part of said backwashing of said first bed, prewashing said second bed by pumping chemical cleansing liquid from an external source through said second port to flow upwardly through said second bed, discontinuing said backwashing of said first bed and said prewashing of said second bed, thereafter backwashing said second bed, during at least part of said backwashing of said second bed, prewashing said third bed by pumping chemical cleansing liquid from an external source through said third port to flow upwardly through said third bed, discontinuing said backwashing of said second bed and said prewashing of said third bed, and applying said combination steps in repeating of such backwashing and prewashing operations with said third and further beds.

3. The method of claim 2 wherein said effluent ports are all of substantially equal size and equally spaced apart along a longitudinal axis.

4. The method of claim 2 wherein said waste liquid purged to waste is monitored for particle content.

5. In a filter cleansing system having a filter tank divided into a plurality of seriate cells each containing filter media, influent means for delivering liquid to be filtered to the top of said filter media, a separate port in each said cell beneath its said filter media for discharging liquid from and charging liquid to the respective said cell, an effluent channel common to the plurality of said separate ports that all communicate with said effluent channel through a longitudinal planar surface in which said separate ports are substantially equally spaced apart a predetermined distance along a longitudinal axis, backwashing means including a pump for forcing backwashing liquid through said separate ports one at a time to flow upwardly through said cell associated with the respective said port, a backwash shoe that slides along said planar surface to access said separate ports and motor means for sliding said backwash shoe in both directions along said planar surface, the improvement which comprises:

said backwash shoe having a sliding surface for longitudinal movement along said planar surface in fluid tight contact therewith, said sliding surface including a central opening, a forward opening and a rearward opening therein, the centers of which are spaced apart said predetermined distance, first conduit means connecting said backwashing means pump to said central opening, a prewash pump connected to a source of chemical treatment liquid, second conduit means connecting said prewash pump to said forward opening, and third conduit means for conveying liquid from said rearward opening to waste.

6. The filter cleansing system of claim 5 wherein said third conduit means comprises means to monitor said liquid being conveyed thereby to waste for suspended solids content.

7. The filter cleansing system of claim 6 wherein said means to monitor measures turbidity of the liquid flowing therethrough.

8. The filter cleansing system of claim 6 wherein said means to monitor measures particle count in the liquid flowing therethrough.

9. The filter cleansing system of claim 6 wherein said means to monitor measures pH of the liquid flowing therethrough.

10. The filter cleansing system of claim 6 wherein said means to monitor measures chlorine content in the liquid flowing therethrough.

11. The filter cleansing system of claim 6 wherein said means to monitor measures turbidity, particle count, pH, or chlorine content or any combination thereof in the liquid flowing therethrough.

* * * * *